US009696000B2

(12) United States Patent
Hellin Navarro et al.

(10) Patent No.: US 9,696,000 B2
(45) Date of Patent: Jul. 4, 2017

(54) MIRROR DEVICE FOR MOTOR VEHICLES

(71) Applicant: FICO MIRRORS, S.A., Barcelona (ES)

(72) Inventors: Sergio Hellin Navarro, Sabadell (ES); Nestor Ruiz Ortega, Terrassa (ES); Maria Luisa Novella, Terrassa (ES); Carles Montero Foix, Sant Feliu de Llobregat (ES); Josep Pujadas Beltran, Premia de Mar (ES); Robert Lopez Galera, Barcelona (ES); Jose Manuel Espinosa, Barcelona (ES)

(73) Assignee: FICO MIRRORS, S.A., Barcelona (ES)

( * ) Notice: Subject to any disclaimer, the term of this patent is extended or adjusted under 35 U.S.C. 154(b) by 64 days.

(21) Appl. No.: 14/280,248

(22) Filed: May 16, 2014

(65) Prior Publication Data
US 2014/0340921 A1    Nov. 20, 2014

(30) Foreign Application Priority Data
May 17, 2013   (EP) .................................... 13168243

(51) Int. Cl.
*F21S 8/10*       (2006.01)
*B60Q 1/26*       (2006.01)
(Continued)

(52) U.S. Cl.
CPC .......... *F21S 48/215* (2013.01); *B60Q 1/2665* (2013.01); *B60R 1/1207* (2013.01);
(Continued)

(58) Field of Classification Search
CPC .. F21S 48/215; F21S 48/2237; F21S 48/2268; F21S 48/2287; B60R 1/06; B60R 1/1207; B60Q 1/2665; B60Q 1/50
(Continued)

(56) References Cited

U.S. PATENT DOCUMENTS

| 5,587,699 A | 12/1996 | Faloon et al. |
| 5,938,320 A | 8/1999 | Crandall |

(Continued)

FOREIGN PATENT DOCUMENTS

| EP | 1391755 A2 | 2/2004 |
| GB | 2338693 A | 12/1999 |

(Continued)

OTHER PUBLICATIONS

Extended European Search Report for 13168243.7 issued by the European Patent Office, Berlin, Germany dated Aug. 27, 2013.

*Primary Examiner* — Anh Mai
*Assistant Examiner* — Arman B Fallahkhair
(74) *Attorney, Agent, or Firm* — Peter B. Scull; Hamilton, DeSanctis & Cha, LLP

(57) ABSTRACT

An outer housing with a cover having a PVD coating; a lens; and an illumination device such as LEDs, light guides, light emitting surfaces and/or blinkers. The lens has a first area internal to the cover, and a second, transparent area extending to one side of the outer housing. The cover has a first cover element external to the lens and of a nature such that the illumination device is visible from the exterior when it is on and not visible from the exterior when it is off. The cover has a substantially opaque second cover element having an overlapping portion between the first area of the lens and the first cover element.

13 Claims, 3 Drawing Sheets

(51) Int. Cl.
  *B60R 1/12* (2006.01)
  *B60Q 1/50* (2006.01)
(52) U.S. Cl.
  CPC ....... *F21S 48/2237* (2013.01); *F21S 48/2268* (2013.01); *F21S 48/2287* (2013.01); *B60Q 1/50* (2013.01)
(58) Field of Classification Search
  USPC ....... 362/494, 511, 545, 540, 487, 509, 498, 362/351
  See application file for complete search history.

(56) References Cited

U.S. PATENT DOCUMENTS

| | | |
|---|---|---|
| 5,942,324 A | 8/1999 | Chu et al. |
| 6,280,068 B1 | 8/2001 | Mertens et al. |
| 6,315,437 B1 * | 11/2001 | Katz ................... B60Q 1/2665 340/475 |
| 6,769,798 B2 | 8/2004 | Mishimagi |
| 6,926,432 B2 | 8/2005 | Rodriguez Barros et al. |
| 7,104,662 B2 | 9/2006 | Kawanishi |
| 7,195,385 B2 | 3/2007 | Zimmermann et al. |
| 7,396,147 B2 | 7/2008 | Munro |
| 8,177,401 B2 | 5/2012 | Hwang et al. |
| 8,568,005 B2 * | 10/2013 | Rodriguez Barros ................. B60Q 1/2665 362/494 |
| 2001/0055214 A1 | 12/2001 | Chang |
| 2006/0146555 A1 | 7/2006 | Inaba |
| 2006/0164228 A1 | 7/2006 | Tseng |
| 2008/0089080 A1 | 4/2008 | Kawaji et al. |
| 2008/0112176 A1 * | 5/2008 | Liesener ................. B29C 45/16 362/494 |
| 2012/0020099 A1 | 1/2012 | Bingle |
| 2012/0127745 A1 | 5/2012 | Serve et al. |
| 2012/0145523 A1 | 6/2012 | Lust et al. |

FOREIGN PATENT DOCUMENTS

| | | |
|---|---|---|
| WO | 9614222 A1 | 5/1996 |
| WO | 2011163380 A2 | 12/2011 |

* cited by examiner

MIRROR DEVICE FOR MOTOR VEHICLES

The present disclosure relates to mirror devices for motor vehicles.

BACKGROUND

Currently mirror devices for motor vehicles are increasingly incorporating more technical features and functions apart from the rear view function, such as LEDs in turn signal indicators and in day running lights, sensing means, cameras, antennae, etc.

The provision of lights, such as turn signal indicators, in the modern mirror devices is also combined with features of design for enhancing the aesthetic appearance of the overall shape.

For example, document U.S. Pat. No. 7,195,385 discloses an exterior rear view mirror for motor vehicles with an auxiliary turn signal. One wall of the mirror housing is made of a transparent plastic material in the area in which the light emitted by the vehicle light is to pass to the exterior. This area is painted with a paint of a matching colour such that the vehicle light arranged within the mirror head cannot be recognized from the exterior but the light emitted by it can penetrate to the exterior to a satisfactory degree.

US2001055214 discloses a rear view mirror device provided with a transparent or semi-transparent casing having a coating layer applied thereon. At least a light-transmissible portion is formed on the casing by removing a predetermined portion of the coating layer on the casing. A light source is provided within the casing for generating light to be emitted from the light-transmissible portion to the outside of the casing, allowing the rear-view mirror device to serve as a turning signal. The casing is attached with a cover having a mirror piece enclosing the light source in the casing.

In general, the provision of such additional technical features and functions in the mirror device results in that the outer mirror casing needs to be redesigned to be adapted to the mounting of the inside parts. As a result, manufacturers are required to re-mould the casing for the rear view mirror and to produce new designs to suitably house the parts therein. This is cost ineffective and time consuming. In addition, aerodynamics is adversely affected due to shapes that are required to be adapted for these technical functions and features.

A mirror device for motor vehicles has been thus devised which has been found that solves or at least mitigates the above technical problems while providing significant advantages, as it will be explained further below.

SUMMARY

A mirror device for motor vehicles is disclosed herein. Advantageous examples are defined herein as well.

The present mirror device comprises an outer housing that is made of any suitable resistant material adapted for receiving a mirror therein as well as for receiving a number of parts such as illumination elements and electronic related parts as it will be disclosed hereinbelow. The outer housing of the present mirror device is suitably designed for being mounted on a motor vehicle. However, other different applications are not ruled out.

The mirror device is further provided with a cover. The cover serves the purpose of covering at least part of the front portion of the outer housing.

As used herein, front, rear, side, etc. portions of the outer housing refer to those portions of the outer housing relative to the vehicle. For example, the front portion of the mirror device refers herein to one portion that is directed toward the front of the motor vehicle.

The present mirror device is further provided with a lens. The lens may be a molded piece at least part of which is at least substantially transparent. The lens is fitted within the outer housing, with at least part of which being arranged behind the cover. The present mirror device is also provided with an inner housing substantially covering the lens. This inner housing may be provided with a dark inner background surface that is substantially parallel to that of the mirror.

An illumination device comprising one or a number of illumination elements is also provided within the outer housing. The illumination elements may be one or more LEDs, at least one light guide, at least one light emitting surface or the like, and/or even a combination thereof. Illumination elements may emit light directly or indirectly incident on the lens. At least one of the illumination elements may be a blinker. In some specific examples, at least one of said illumination elements may be arranged such that light is directed to the side and/on the rear of the outer housing of the mirror device.

The lens of the present mirror device has at least two different areas (first and second area) and the cover has at least two different cover elements (first and second cover element) as it will be explained below.

The first area of the lens is mounted internal to the cover, i.e., behind this. This first area of the lens is such that it allows the light to at least partially pass forward and at least partially pass to the vehicle side. A colour modifier filter could be also provided associated with the first area of the lens.

The second area of the lens in some examples extends to at least one side portion of the outer housing. This second area of the lens is made of a transparent material. The light is thus allowed to pass through the second area of the lens preferably without altering its colour and with negligible loss light relative to the first area. The second area of the lens may also allow light to be directed to the driver if required.

The first cover element of the cover is external to the lens. Indeed, the first cover element could extend over the entire length of the cover. The first cover element is of a nature such that at least one of the above mentioned illumination elements of the illumination device is visible from the exterior of the outer housing when the illumination device is activated, i.e. when the illumination elements are turned on, and such that at least one of the above mentioned illumination elements is not visible from the exterior of the outer housing when the illumination device is not activated, i.e. when the illumination elements are turned off.

The above is accomplished by providing at least the first cover element of the present mirror device may be provided with a coating with one or more thin films applied by a vacuum deposition method, such as for example, through physical vapour deposition (PVD). The thin film(s) is/are applied onto the cover of the mirror device through condensation of a vaporized form of the film materials by high temperature vacuum evaporation and subsequent condensation, plasma sputter bombardment, etc. A wide range of decorative coating finishes can be applied in this way. This coating onto the cover makes it possible that visual (optical) information such as side light and blinkers to be provided by the mirror device such that it is only visible when the illumination device is turned on.

According to one important design feature of the present mirror device, the first cover element is preferably mounted flush with the second area of the lens for the purposes making the assembly compact and with good aerodynamic characteristics. This is made possible due to the two-area-design of the lens such that the first and second areas of the lens lie in different planes. The second area of the lens is also mounted flush with the outer housing. This results in a very compact, closed assembly that enhances the aerodynamic characteristics of the mirror device when the vehicle is travelling while reducing noise improving travelling comfort to the user.

The second cover element is made of a substantially opaque material. It may be over-molded on the first cover element. The second cover element has an overlapping portion that is arranged behind at least one portion of the first cover element. Specifically, this overlapping portion of the second cover element may be sandwiched between at least one portion of the first area of the lens and at least one portion of the first cover element.

At least the first cover element may be made of a lightweight resistant thermoplastic material that is at least substantially transparent. This material is preferably for example PMMA or the like. In addition, at least the first cover element may have a colour matching that of the outer housing of the mirror device.

Due to the design of the present mirror device, which combines illumination elements (e.g. turn indicators) that are hidden when turned off together with flush mounted parts, a pleasant aesthetics and enhanced aerodynamic characteristics are obtained. This compact design results in wind noise reduction as there is no joints, grooves or other design discontinuities which improves travelling comfort. The two-area-design of the lens allows two light differentiated, independent areas to be provided such that there is no loss in intensity of light.

Additional objects, advantages and features of examples of the present mirror device will become apparent to those skilled in the art upon examination of the description, or may be learned by practice thereof.

BRIEF DESCRIPTION OF THE DRAWINGS

Particular implementations of the present mirror device will be described in the following by way of several non-limiting examples with reference to the appended drawings, in which.

DETAILED DESCRIPTION OF EXAMPLES

Figure 1:
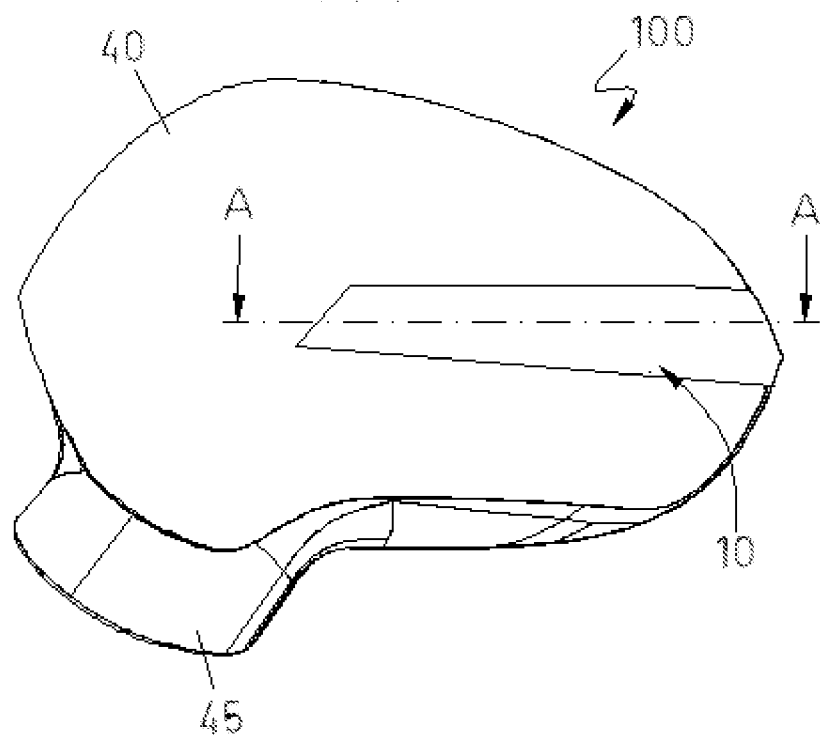
FIG. 1 is a general perspective view of the present mirror device for a motor vehicle.

In the examples shown in the figures, where like reference numerals refer to like parts, the examples of the present mirror devices 100 comprise an outer housing 40 that is suitably adapted for including a number of parts therein such as electrical components like PCBs 50, 55, connectors 60, an illumination device 30, 31, etc. The outer housing 40 is also adapted for receiving a rear view mirror (not shown) and it is provided with a vehicle mount portion 45.

Figure 2:
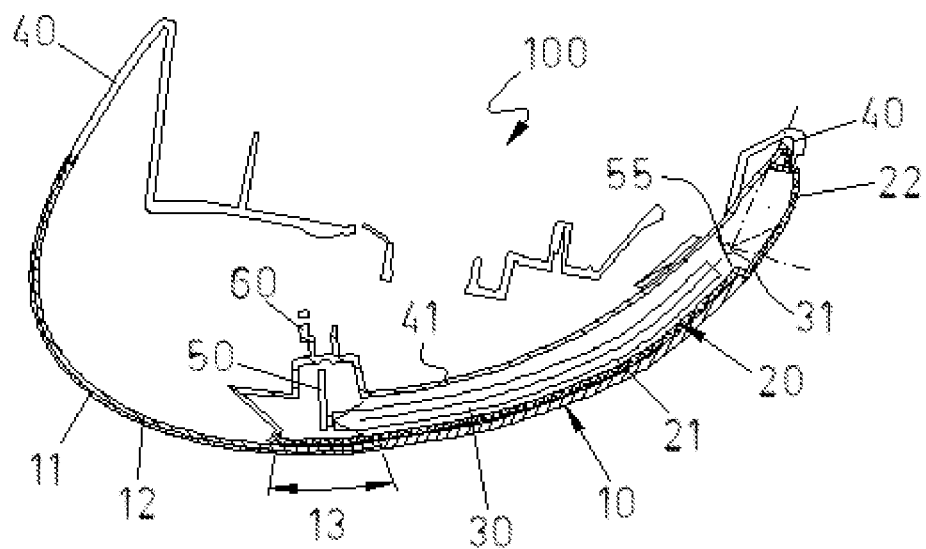
FIG. 2 is a sectional view taken along line A-A of FIG. 1 of a first example of the mirror device for a motor vehicle where the illumination elements comprise a light guide and a LED.
Figure 3:
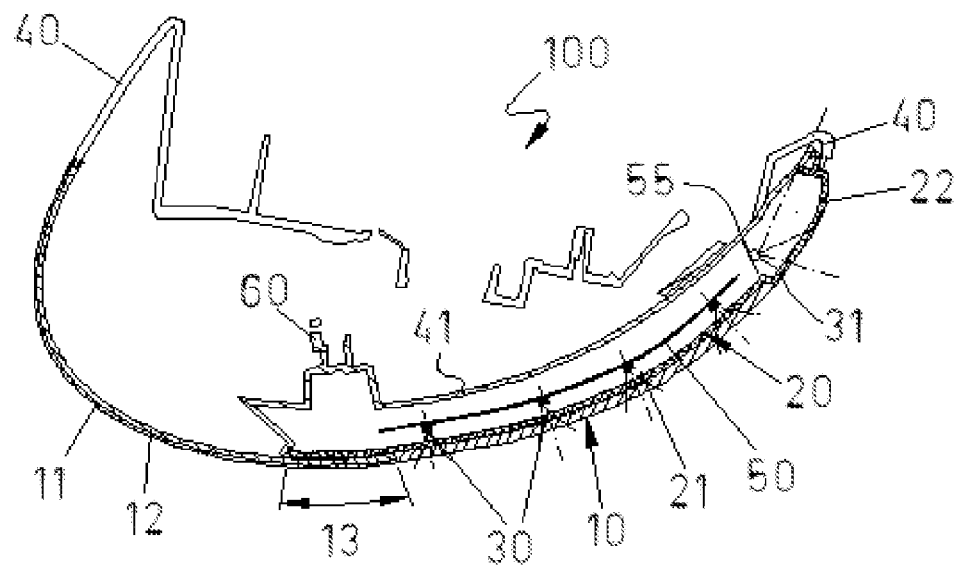
FIG. 3 is a sectional view taken along line A-A of FIG. 1 of a first example of the mirror device for a motor vehicle where the illumination elements all comprise LEDs.
Figure 4:
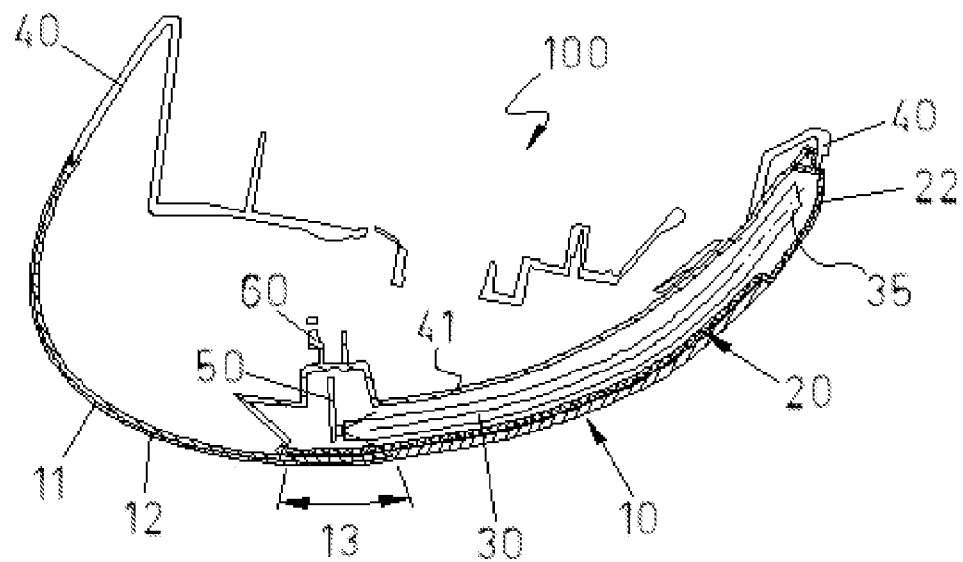
FIG. 4 is a sectional view taken along line A-A of FIG. 1 of a first example of the mirror device for a motor vehicle where the illumination elements comprise a light guide.

An inner housing 41 is also provided within the outer housing 40. The inner housing 41 is arranged such that it substantially covers the lens 20 as shown in FIGS. 2-4. The inner housing 41 is provided with a dark inner background surface (not shown) that is substantially parallel to that of the mirror. The connectors 60 may be formed integral with the inner housing 41.

The mirror device 100 of the example shown is further provided with a cover 10. The cover 10 serves the purpose of covering at least a part of the front portion of the outer housing 40, that is, the one corresponding to the front portion of the motor vehicle.

A lens 20 is also provided within the outer housing 40. At least part of the lens 20 is arranged behind the cover 10, as it will be explained further below.

An illumination device 30, 31 comprising at least one illumination element is also arranged within the outer housing 40. The arrangement of the illumination device 30, 31 defines several examples of the mirror device 100. Three of such examples are shown as non-limiting examples in FIGS. 2, 3 and 4 of the drawings. They will be explained further below.

The lens 20 in the examples shown in FIGS. 2-4 has two different areas.

A first area 21 of the lens 20 is mounted internal to the cover 10 as shown in FIGS. 2-4. The first area 21 of the lens 20 that is positioned behind the cover 10 is made of a material such that the light emitted from the illumination device 30, 31 is allowed to at least partially pass forward and at least partially pass toward the vehicle side, that is, to a side portion of the outer housing 40. This first area 21 of the lens 20 of the mirror device 100 may include a colour modifier filter (not shown in the drawings).

A second area 22 of the lens 20 extends to at least one side portion of the outer housing 40. This second area 22 of the lens 20 is made of a transparent material such that light from the illumination device 30, 31 is allowed to pass through without altering its colour and with negligible loss light relative to the first area 21. The second area 22 of the lens 20 may allow light to be directed to the driver as well.

The cover 10 in the examples shown in FIGS. 2-4 has two different cover elements 11, 12, as explained below. The first cover element 11 is overmoulded on the second cover element 12. The first cover element 11 is made of PMMA or the like and has a colour matching that of the outer housing 40 of the mirror device 100.

Figure 5:
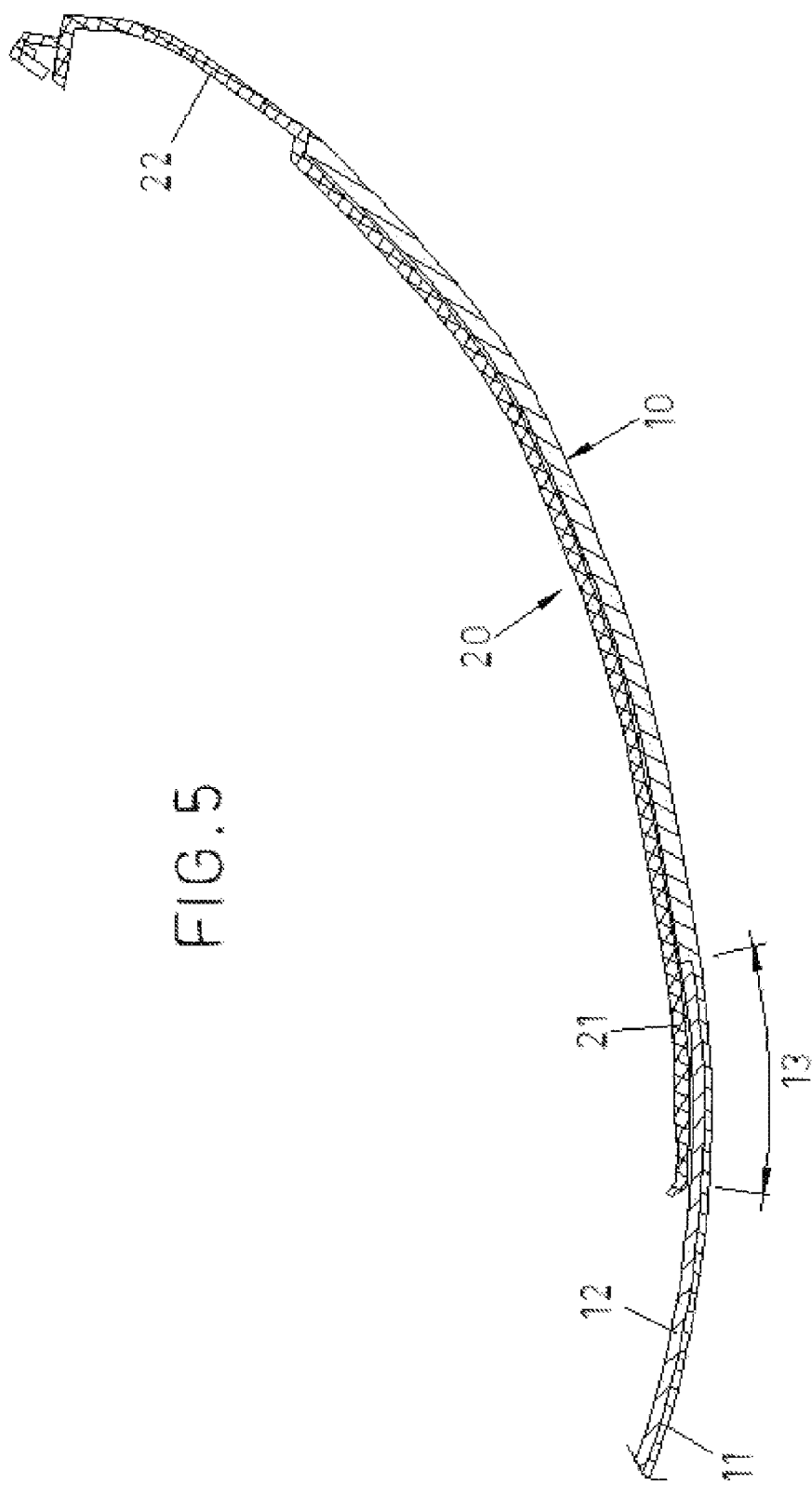
FIG. 5 is a fragmentary enlarged, sectional view taken along line A-A of FIG. 1 showing the lens and the cover of the outer housing of the present mirror device.

The first cover element 11 of the cover 10 is external to the lens 20 as shown in FIGS. 2-4 and in more detail in FIG. 5. The first cover element 11 is of a nature such that the illumination elements 30 are visible from the exterior of the outer housing 40 only when the illumination device is turned on. When the illumination device is turned off, the illumination elements 30 are not visible from the exterior of the outer housing 40.

This is accomplished by applying at least one thin film of material through a physical vapour deposition (PVD) onto the first cover element 11. This renders the illumination device 30 visible from the exterior of the outer housing 40 only when the illumination device 30 is on as explained.

The first area 21 and second area 22 of the lens 20 lie in different planes. This configuration makes it possible that the second area 22 of the lens 20 is mounted flush with the first cover element 11. This advantageously renders the assembly very compact and with enhanced aerodynamic characteristics.

The second cover element 12 of the cover 10 is made of a substantially opaque material and it is placed behind the first cover element 11 such that an overlapping portion 13 is defined. More specifically, and as shown in FIGS. 2-4, and more clearly in FIG. 5, this overlapping portion 13 of the second cover element 12 is defined between an end portion of the first area 21 of the lens 20 and one portion of the first cover element 11.

The different examples of the illumination device 30, 31 are now disclosed in connection with FIGS. 2-4 of the drawings.

In the example of FIG. 2, the illumination device of the mirror device 100 includes a first set of illumination elements 30 and a second set of illumination elements 31. The sets of illumination elements 30, 31 are different and independent from each other although examples where the sets of illumination elements 30, 31 are dependent on each other are not ruled out. In this particular example of FIG. 2, the first set of illumination elements comprises a light guide 30 that is connected to a PCB 50. The light guide 30 extends substantially along the first area 21 of the lens 20 as shown in FIG. 2 of the drawings. The second set of illumination elements comprises a LED 31. The LED 31 is provided such that light is incident on the second area 22 of the lens 20. LED 31 is connected to a corresponding PCB 55. The PCB 55 of the LED 31 is arranged inclined within the outer housing 40 such that light is directed to side and rear portions of the outer housing 40.

In the example of the illumination device depicted in FIG. 3, the illumination device comprises a first set of illumination elements 30 and a second set of illumination elements 31. In this case both the first and the second sets of illumination elements 30, 31 comprise LEDs. Specifically, the first set of illumination elements comprises a number of LEDs 30 connected to a PCB 50. The PCB 50 and the LEDs 30 extend substantially along the first area 21 of the lens 20. The second set of illumination elements comprises a LED 31. The LED 31 provided such that light is incident on the second area 22 of the lens 20. The LED 31 is connected to a PCB 55. The PCB 55 of the LED 31 is arranged inclined inside the outer housing 40 such that light is directed to side and rear portions of the outer housing 40. Like the example of FIG. 2, the LEDs of the first and the second sets of illumination elements 30, 31 are independent from each other although examples where they are dependent on each other are not ruled out.

A further alternative example of the illumination device is shown in FIG. 4. In this case, the illumination device comprises a single illumination element comprising a light guide 30 connected to a PCB 50. The light guide 30 of the illumination device in this case extends substantially along the entire length of the lens 20, that is, substantially along the first and second areas 21, 22 of the lens 20. Light emitted from the light guide 30 is directed on the lens 20 both to the front, side and rear portions of the outer housing 40. The light guide 30 may be turned on such that the first and second areas 21, 22 of the lens 20 are simultaneously illuminated. Alternatively, selective parts of the light guide 30 may be turned on such that the first area 21 and/or the second area 22 of the lens 20 are illuminated. An end portion 35 of the light guide 30 may be adapted such that light is directed to the side and rear portions of the outer housing 40. According to this example of FIG. 3, the light guide 30 could be additionally or alternatively a light emitting surface.

In all the above described examples with regard to FIGS. 2, 3 and 4 of the drawings, at least one of the illumination elements 30, 31 is a blinker. For example, the illumination element(s) 30 associated with at least the first area 21 of the lens 20 is a blinker so that the mirror device 100 is fitted with a turn indicator feature.

Although only a number of particular examples of the present mirror device have been disclosed herein, it will be understood by those skilled in the art that other alternative examples and/or uses and obvious modifications and equivalents thereof are possible. For example, although different examples of the illumination device have been shown and disclosed comprising a light guide combined with a LED, a plurality of LEDs or a single light guide or light emitting surface, the illumination device may alternatively comprise other different suitable combinations of such illumination elements. On the other hand, the second set of illumination elements in the example of FIGS. 2 and/or 3 could alternatively comprise a number of LEDs, for example.

The present disclosure thus covers all possible combinations of the particular examples described herein.

Reference signs related to drawings and placed in parentheses in a claim, are solely for attempting to increase the intelligibility of the claim, and shall not be construed as limiting the scope of the claim. Thus, the scope of the present disclosure should not be limited by particular examples, but should be determined only by a fair reading of the claims that follow.

The invention claimed is:

1. A mirror device for motor vehicles, comprising
an outer housing having a cover,
a lens provided in the outer housing, and
an illumination device comprising at least one illumination element,
the lens having a first area internal to the cover, and a second, transparent area extending to at least one side portion of the outer housing, said second area of the lens being mounted flush with the outer housing, and
the cover having at least a first cover element external to the lens, the first cover element including one or more thin films applied by vacuum deposition, arranged extending over the entire length of the cover and mounted flush with the second area of the lens, the first cover element being configured so that the at least one illumination element is visible from the exterior of the outer housing only when the illumination device is turned on and configured so that when the illumination device is turned off, the at least one illumination element is not visible from the exterior of the outer housing,
the cover further comprising a substantially opaque second cover element having an overlapping portion that is arranged on at least one portion of the first cover element,
wherein the first area of the lens is mounted internal to the cover, positioned behind the cover such that the light emitted from the illumination device at least partially passes forward and at least partially passes toward the vehicle side.

2. A mirror device as claimed in claim 1, wherein the overlapping portion of the second cover element is defined between one portion of the first area of the lens and one portion of the first cover element.

3. A mirror device as claimed in claim 1, wherein the first cover element is overmoulded on the second cover element.

4. A mirror device as claimed in claim 1, wherein the cover is provided with a physical vapour deposition (PVD) coating.

5. A mirror device as claimed in claim 1, wherein at least the first cover element is provided with a film such that the illumination device is visible from the exterior of the outer housing when it is activated and such that the illumination device is not visible from the exterior of the outer housing when it is not activated.

6. A mirror device as claimed in claim 1, wherein at least the first cover element is made of PMMA.

7. A mirror device as claimed in claim 1, wherein at least the first cover element has a colour matching that of the outer housing.

8. A mirror device as claimed in claim 1, wherein the illumination device is arranged inside the outer housing for emitting light incident at least one of the first area and the second area of the lens.

9. A mirror device as claimed in claim 1, wherein the illumination device comprises at least one LED.

10. A mirror device as claimed in claim 1, wherein the illumination device comprises at least one light guide.

11. A mirror device as claimed in claim 1, wherein the illumination device comprises at least one blinker.

12. A mirror device as claimed in claim 1, wherein the first and second areas of the lens lie in different planes.

13. A mirror device as claimed in claim 1, wherein it further comprises a colour modifier filter associated with the first area of the lens.

* * * * *